United States Patent [19]
Beck et al.

[11] Patent Number: 6,062,408
[45] Date of Patent: May 16, 2000

[54] WIDE MOUTH HOT FILL CONTAINER

[75] Inventors: Martin H. Beck; George F. Rollend, both of Amherst; Robert J. Caldicott, Nashua, all of N.H.

[73] Assignee: DTL Technology Limited Partnership, Amherst, N.H.

[21] Appl. No.: 08/833,794

[22] Filed: Apr. 9, 1997

[51] Int. Cl.[7] .............................. B65D 1/10; B65D 1/46; B29C 49/18; B29C 49/64
[52] U.S. Cl. ........................... 215/379; 215/42; 215/44; 264/521; 264/903
[58] Field of Search .............................. 215/42–45, 370, 215/379, 373, 383; 220/906; 264/521, 159, 527

[56] References Cited

U.S. PATENT DOCUMENTS

| | | |
|---|---|---|
| 521,788 | 6/1894 | Flanigan . |
| 958,513 | 5/1910 | Love . |
| 1,770,548 | 1/1930 | Oven . |
| 2,340,353 | 2/1944 | Weaver . |
| 2,385,105 | 9/1945 | Samelson . |
| 2,423,295 | 7/1947 | Crabbe et al. . |
| 2,447,340 | 8/1948 | Jackson . |
| 2,456,560 | 12/1948 | Keith . |
| 2,852,054 | 10/1958 | Motley . |
| 2,961,119 | 12/1960 | Leach . |
| 3,038,624 | 6/1962 | Wieckmann . |
| 3,065,677 | 11/1962 | Loeser . |
| 3,171,458 | 3/1965 | Strong . |
| 3,200,981 | 8/1965 | Harding . |
| 3,243,851 | 4/1966 | Reittier Jr. et al . |
| 3,250,417 | 5/1966 | Powers, Jr. et al. . |
| 3,272,369 | 9/1966 | Grimsley . |
| 3,285,452 | 11/1966 | Moloney et al. . |
| 3,286,866 | 11/1966 | McIntosh . |
| 3,339,770 | 9/1967 | Weigand . |
| 3,343,700 | 9/1967 | Heubl . |
| 3,344,942 | 10/1967 | Hedgewick . |
| 3,348,717 | 10/1967 | Treanor . |
| 3,352,127 | 11/1967 | Skinner, Sr. . |
| 3,352,448 | 11/1967 | Livingstone . |
| 3,374,913 | 3/1968 | Zipper . |
| 3,405,439 | 10/1968 | Uemura . |
| 3,418,409 | 12/1968 | Hesse et al. . |
| 3,460,703 | 8/1969 | Leftault, Jr. . |
| 3,482,725 | 12/1969 | Exton . |
| 3,532,786 | 10/1970 | Coffman . |
| 3,557,275 | 1/1971 | Longshaw et al. . |
| 3,557,985 | 1/1971 | St. Denis et al. . |
| 3,567,233 | 3/1971 | Stepanich . |
| 3,612,324 | 10/1971 | Malick . |
| 3,613,929 | 10/1971 | Treanor . |
| 3,733,309 | 5/1973 | Wyeth et al. ................ 215/373 X |
| 3,764,038 | 10/1973 | Uhlig ........................ 215/44 |
| 3,784,041 | 1/1974 | Birch . |
| 3,802,799 | 6/1974 | Abbes et al. . |
| 3,861,551 | 1/1975 | Hannon . |
| 4,016,996 | 4/1977 | Aichinger et al. . |
| 4,024,975 | 5/1977 | Uhlig ........................ 215/373 |
| 4,069,937 | 1/1978 | Smalley . |
| 4,090,631 | 5/1978 | Grussen . |
| 4,091,948 | 5/1978 | Northup ..................... 215/222 |
| 4,141,463 | 2/1979 | Smith ....................... 220/359 |
| 4,143,785 | 3/1979 | Ferrell ...................... 215/270 |
| 4,153,172 | 5/1979 | Bialobrzeski ............... 215/209 |
| 4,196,818 | 4/1980 | Brownbill .................. 215/252 |
| 4,202,462 | 5/1980 | Imber ....................... 220/293 |
| 4,206,852 | 6/1980 | Dunn et al. ................ 215/252 |
| 4,209,102 | 6/1980 | Dunn et al. ................ 215/329 |
| 4,210,251 | 7/1980 | Grussen .................... 215/329 |
| 4,218,067 | 8/1980 | Halling . |
| 4,233,022 | 11/1980 | Brady et al. .............. 264/521 X |
| 4,253,581 | 3/1981 | Aichinger et al. .......... 215/344 |
| 4,257,525 | 3/1981 | Thompson . |
| 4,274,544 | 6/1981 | Westfall ................... 215/344 |
| 4,281,774 | 8/1981 | Mumford ................... 215/306 |
| 4,281,979 | 8/1981 | Doherty et al. ............ 425/391 |
| 4,290,614 | 9/1981 | Moll . |
| 4,343,408 | 8/1982 | Csaszar .................... 215/258 |
| 4,345,692 | 8/1982 | Obrist et al. ............. 215/252 |
| 4,360,114 | 11/1982 | Owens ...................... 215/329 |
| 4,360,149 | 11/1982 | Hein, Jr. . |
| 4,386,044 | 5/1983 | Arndt et al. . |
| 4,392,579 | 7/1983 | Uhilg et al. .............. 215/253 |
| 4,394,918 | 7/1983 | Grussen .................... 215/243 |
| 4,418,828 | 12/1983 | Wilde et al. .............. 215/252 |
| 4,442,947 | 4/1984 | Banich, sr. ............... 215/344 |
| 4,470,513 | 10/1984 | Ostrowsky ................. 215/252 |
| 4,475,274 | 10/1984 | Beckstrom et al. . |
| 4,496,064 | 1/1985 | Beck et al. ................ 215/43 |

| | | |
|---|---|---|
| 4,497,765 | 5/1985 | Wilde et al. . |
| 4,497,855 | 2/1985 | Agrawal et al. .................... 215/373 X |
| 4,506,795 | 3/1985 | Herr ........................................ 215/252 |
| 4,550,844 | 11/1985 | Lininger ................................. 251/252 |
| 4,552,279 | 11/1985 | Mueller et al. ......................... 215/318 |
| 4,563,325 | 1/1986 | Coffman . |
| 4,576,843 | 3/1986 | Beck et al. ............................ 215/42 X |
| 4,591,066 | 5/1986 | Moen ................................... 220/906 X |
| 4,595,547 | 6/1986 | Herr . |
| 4,618,515 | 10/1986 | Collette et al. ...................... 215/383 X |
| 4,665,682 | 5/1987 | Kerin et al. ............................... 53/452 |
| 4,755,404 | 7/1988 | Collette ............................... 215/373 X |
| 4,856,667 | 8/1989 | Thompson ............................ 215/45 X |
| 5,122,327 | 6/1992 | Spina et al. ......................... 215/383 X |
| 5,409,750 | 4/1995 | Hamada et al. ...................... 215/44 X |
| 5,547,631 | 8/1996 | Mero et al. ............................. 264/521 |
| 5,562,960 | 10/1996 | Sugiura et al. ...................... 215/373 X |

FOREIGN PATENT DOCUMENTS

| | | |
|---|---|---|
| 76 4 429 | 3/1971 | Belgium . |
| 2053685 | 4/1992 | Canada ................................... 215/370 |
| 0 049 876 | 10/1981 | European Pat. Off. . |
| 555488 | 6/1923 | France . |
| 788148 | 12/1957 | France . |
| 2 306 135 | 10/1976 | France . |
| 2 378 689 | 8/1978 | France . |
| 1 811 318 | 7/1969 | Germany . |
| 28 29 755 | 1/1980 | Germany . |
| 35 23 771 | 1/1987 | Germany . |
| 351515 | 2/1961 | Switzerland . |
| 607 702 | 10/1978 | Switzerland . |
| 930866 | 7/1963 | United Kingdom . |
| 1024762 | 4/1966 | United Kingdom . |
| 1048727 | 11/1966 | United Kingdom . |

*Primary Examiner*—Sue A. Weaver
*Attorney, Agent, or Firm*—David and Bujold

[57] ABSTRACT

A method of forming a wide mouth blow molded thermoplastic container comprising the steps of i) stretch blow molding from a preform, an intermediate article defining the container with the mouth being threaded and/or flanged, the mouth terminating in an accommodation element having a neck finish that supports the preform in the blow mold; ii) heat setting the intermediate article including the entire container while still in the mold, and iii) removing the intermediate article of manufacture from the mold and severing the accommodation element to produce the container, and an article when made by the method.

14 Claims, 4 Drawing Sheets

6,062,408

WIDE MOUTH HOT FILL CONTAINER

FIELD OF INVENTION

This invention relates, in general, to new and useful improvements in plastic containers, and more particularly to a polyester wide mouth container wherein the entire container is biaxially oriented and is heat set from an injection molded preform using a stretch blow molding process to provide the strength necessary in the packaging of hot ingredients.

BACKGROUND OF THE INVENTION

Wide mouth plastic containers for hot ingredients, in particular containers made of polyethylene terephthalate (PET), are commercially available. These PET containers typically are formed from a wide mouth preform using conventional blow molding techniques. The wide mouth container, formed by such a conventional blow molding process, results in a container having a neck of insufficient strength and thickness in comparison with the rest of the container. This is because with conventional blow molding techniques preforms that have threads already formed in the preform are used. In such preforms, if they are to be utilized substantially in their entirety, as is now customary in bottle forming, the diameters of the mouth of the preform must match that of the resultant container and the blow molding of the preform will result in insufficient biaxial orientation of the container particularly in the container body wall adjacent the open mouth.

A heat setting process helps to alleviate potential shrinkage and distortion, however, the finish of a conventionally blown wide mouth container is not exposed to this heat setting process.

It has also been proposed (U.S. Pat. No. 4,576,843) to create a wide mouth container using a preform with a small diameter preform as is customarily utilized in the blow molding of bottles with the preform being of a materially lesser length than that of the resultant container. Here there is formed an intermediate article of manufacture which has a portion in the form of an accommodation element which permits the necessary biaxial orientation of the thermoplastic material throughout the container, the accommodation element being severed from the container and becoming reusable scrap. This technology results in preforms having a flanged portion where the resultant trimming typically takes place. The trimming results in a wide mouth container biaxially oriented throughout with a flange as its neck portion. This flange is used to attach a lid for holding the contents within the container. The present technology does not provide a hot fillable wide mouth container which resists shrinkage and distortion at hot fill temperatures greater than 160° F.

An object of this invention is to provide a wide mouth container blow molded from a small diameter preform (as opposed to a parison used in extrusion blow molding), as is customarily utilized in the stretch blow molding of bottles, wherein the entire container, including the neck finish, is biaxially oriented and heat set to give thermal stability to the entire container.

Another object is to provide a wide mouth container having a screw thread formed during the blowing operation.

Another object is to increase the geometric strength of the container by curling the edges of the finished container, so that the container is better able to withstand distortion and shrinkage. This acts as a safety lip for drinking from the container and a means of providing a "snap" cap when made without blown threads.

SUMMARY DESCRIPTION OF THE INVENTION

The present invention utilizes the stretch blow molding of a preform to produce a heat set biaxially oriented container which cannot be produced by the blow molding from an extruded parison which does not produce biaxial orientation or heat setting.

According to the invention there is provided a method of forming a wide mouth blow molded biaxially oriented heat set thermoplastic container comprising the steps of i) stretch blow molding from a preform, an intermediate article comprising the container with the mouth of the container terminating in an accommodation element having a neck that supports the preform in a mold; ii) heat-setting the intermediate article including the entire container in the mold, and iii) removing the intermediate article of manufacture from the mold and severing the accommodation element to produce the biaxially oriented heat set container.

Also according to the invention there is provided a method of forming a wide mouth blow molded thermoplastic container having a screw thread formed adjacent the mouth comprising the steps of i) supporting a preform in a blow mold by a preform neck finish, the mold having a cavity defining the outer shape of the container including the thread; ii) without exceeding about 300° F., heating the thread forming portion of the cavity to from about 25° F. to about 100° F. above the temperature of the remainder of the cavity; iii) stretching the preform longitudinally using an extendable stretch rod; iv) blowing the preform to form an intermediate article comprising the container, having blow molded threads connected to the neck finish by an accommodation element, and v) following removal of the intermediate article from the mold, severing the container from the accommodation element.

Also according to the invention there is provided a container when made by the methods of the invention.

BRIEF DESCRIPTION OF THE DRAWING

The invention will now be described, by way of example with reference to the accompanying drawings, in which.

DETAILED DESCRIPTION OF PREFERRED EMBODIMENTS

Figure 1:
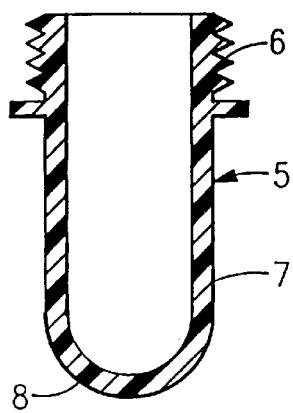
FIG. 1 is a sectional view through a preform which is utilized in accordance with this invention to form the container of FIG. 3.

Referring now to the drawings in detail, it will be seen that there are illustrated embodiments of a wide mouth container formed by blow molding. The container 1 (FIGS. 3 and 7), has a cylindrical body 2 and a base 3 of the modified champagne type so as to resist internal pressures. The upper part of the body 2 terminates in a wide mouth 4 adapted to have attached thereto any one of many conventional types of closure. The container material preferably is PET (polyethylene terephthalate) or other suitable polyester.

Figure 2:
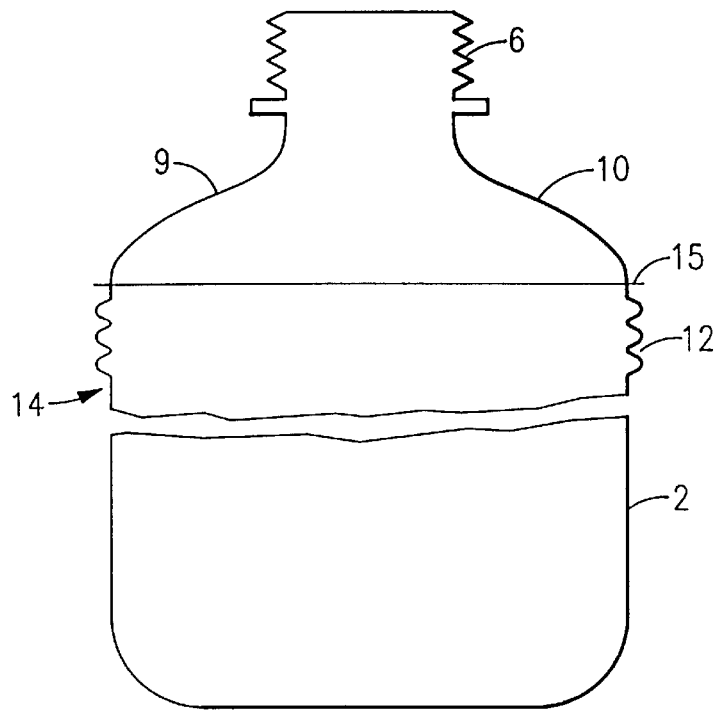
FIG. 2 is an elevation depicting an intermediate article of manufacture formed from the preform of FIG. 1 utilizing blow molding techniques in accordance with the invention.

In accordance with the invention, it is desirable to utilize a conventional preform configuration such as the preform 5 illustrated in FIG. 1. Basically, the preform comprises a neck portion 6 used to support the preform in a mold during a subsequent blowing operation, a generally cylindrical body portion 7 and a hemispherical bottom portion 8. The preform once blown forms an intermediate article as depicted in FIG. 2. The intermediate article comprises an open neck 6, substantially unchanged from the preform, terminating in a tapered transition portion 9 that increases in diameter to the diameter of the desired wide mouth container 1. The neck 6 and tapered portion 9 will, hereafter, be referred to as the accommodation element 10. From the accommodation element 10 extends a generally cylindrical body 2, which terminates in a closed base 3 of any desired shape. However a champagne bottle shaped base is preferred.

The preform is temperature conditioned to prepare it for subsequent blowing operations. Appropriate temperature conditioning requires heating the preform to the point where increased workability of the preform is established. Next, the PET is placed in a blow mold 11 supported by the neck 6. An extendable stretch rod is then used to longitudinally stretch the preform to provide sufficient longitudinal (axial) orientation of the PET. While the preform is being stretched to the desired longitudinal extent and/or, thereafter, the blowing operation begins to create the hoop orientation.

The surface of the PET preform is typically temperature conditioned to a temperature of from about 185° F. to about 220° F. for conventional blow molding and from about 220° F. to about 250° F. if heat setting is required in the mold. The mold is maintained at about 40° F. to about 55° F. for conventional blow molding and from about 180° F. to about 250° F. where heat setting is required. At the end of the blow molding and, if appropriate, heat setting cycle, the container is cooled with cool air to stabilize the blown container prior to removal from the blow mold.

The residence time in the blow mold ranges from 3.0 to 4.5 seconds from commencing stretching and blowing of the preform to the mold being opened for removal of the blown container.

Difficulty exists in the formation of a blown screw thread 12 and a typically heated mold will not provide for satisfactory thread formation during the blowing operation. It is, therefore, appropriate to include a selectively temperature controlled portion 13 of the cavity of the blow mold to selectively control the temperature in the region in which threads are to be formed. The selective temperature control is used to increase the temperature of the mouth defining portions of the cavity from about 25° F. to about 100° F. higher than the remainder of the cavity 25 while not exceeding 300° F. Due to the increased temperature in the thread forming portion 13 of the cavity, the preform becomes less viscous in this area which allows sufficient material flow during blowing operations to ensure satisfactory formation of the threads and biaxial orientation of the material forming the screw threads 12.

The stretching and blowing of the preform to form the intermediate article 14 ensures that the wide mouth container 1 is biaxially oriented in its entirety. Due to longitudinal stretching and subsequent circumferential stretching, the container achieves sufficient biaxial orientation to provide desired structural integrity and strength.

Figure 3:
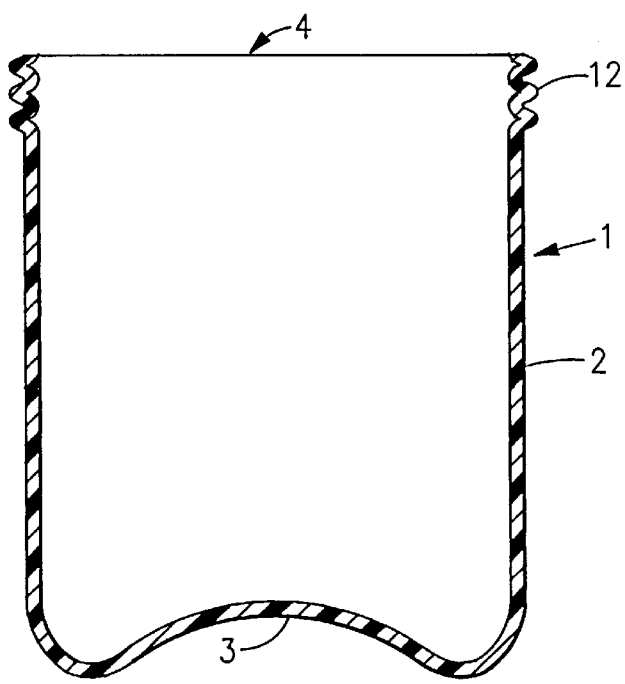
FIG. 3 is a sectional view of a threaded wide mouth container which is formed in accordance with the invention.

The intermediate article is intermediate in the sense that, once removed from the mold, severing of the accommodation element 10 from the intermediate article 14 is required to finally form the wide mouth container 1 (FIG. 3). The resultant wide mouth container 1 has consistent biaxial orientation and heat set throughout including the mouth portion 4 with the formed screw threads 12.

In a preferred embodiment, particularly for hot fill wide mouth containers, the intermediate article 14 is heat set in the mold. A container without heat setting is susceptible to shrinkage and distortion when used to store hot food items with fill temperatures greater than 160° F. Of critical importance is the ability to heat set the entire container. According to the present invention the entire container including the mouth 4 is heat set. The heat setting operation occurs when the intermediate article 14 is blown in the mold and is exposed to a temperature from about 180° F. to about 250° F. for about 3 seconds to about 4.5 seconds). This heat setting of the intermediate article ensures that the entire container including the mouth 4 is heat set. This produces crystallinity and stress relief in the entire wide mouth container. As a result of the blowing and heat setting operations, the container including screw threads 12 is increased in strength and less likely to shrink and distort when hot filled with food items.

Once the intermediate article 14 is removed from the mold, the accommodation element 10 is severed from the intermediate article 14 resulting in the wide mouth container 1. In the embodiment of FIG. 3, the mouth portion 4 comprises screw threads 12, and the container is sealed by way of a screw threaded closure after hot filling. The mouth may first be closed by a foil induction seal. Heat setting enhances the adhesion of the induction seal closure to the mouth.

Figure 10:
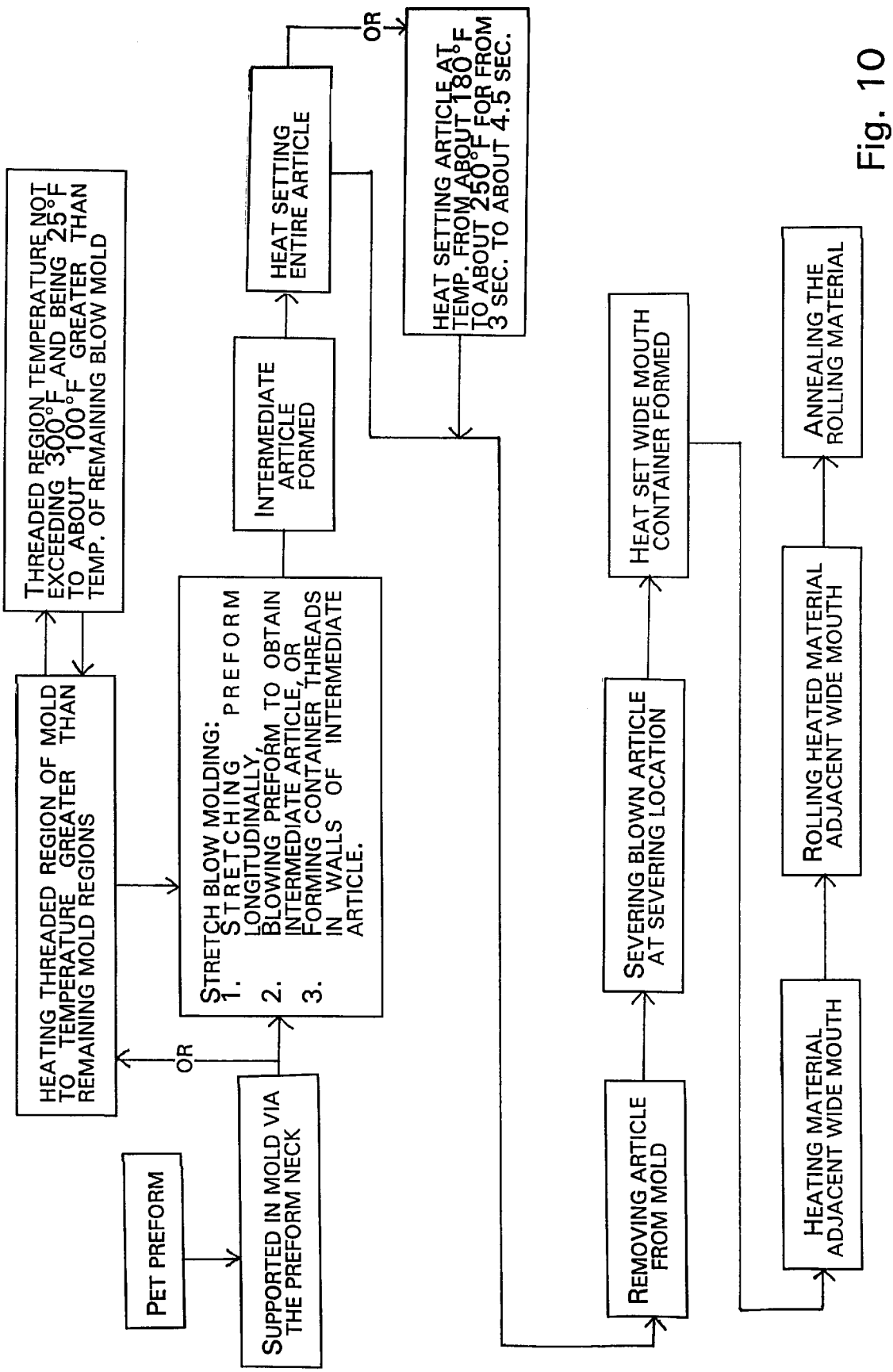
FIG. 10 is a diagrammatic flow diagram of the manufacturing process of the present invention.

A summary of the above described container manufacturing process is shown diagrammatically in FIG. 10.

Figure 6:
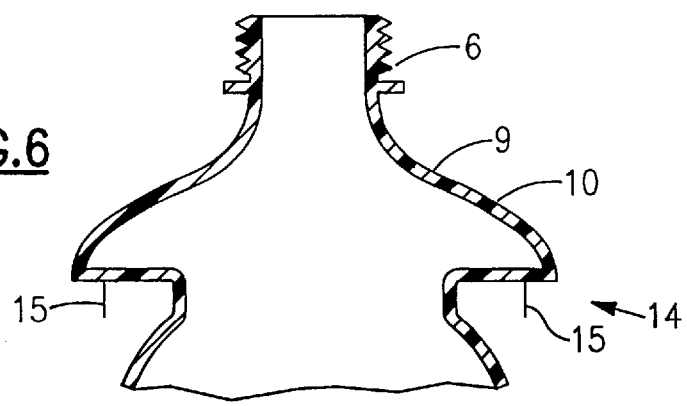
FIG. 6 is a fragmentary sectional view depicting an intermediate article of manufacture, which is formed in accordance with the invention, in which the mouth of the container comprises a flange.
Figure 7:
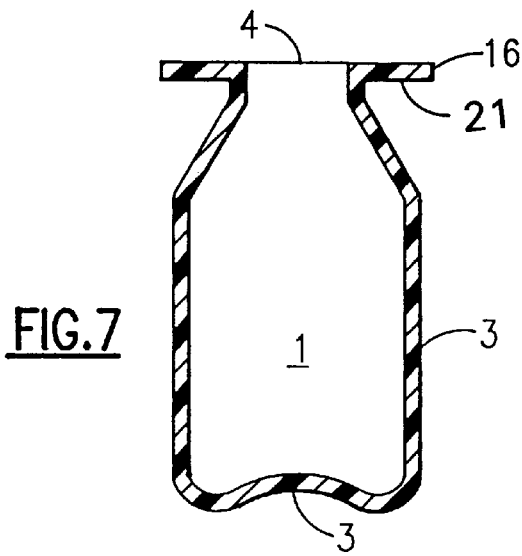
FIG. 7 is a sectional view depicting the container once the accommodation element, shown in FIG. 6, is severed.

With reference now to FIG. 7, a wide mouth hot fill container 1 has a mouth finish in the form of a radially outwardly extending flange 21 in place of the threads of the first embodiment illustrated in FIG. 3. This container is produced from an intermediate article, a portion of which is illustrated in FIG. 6, with the accommodation element 10 removed at a cut line 15 thereby defining the outer periphery of the flange. As with the first embodiment, heat setting of the intermediate article results in the entire finished container being heat set, thereby ensuring that the flange area is crystallized and stress relieved to improve its resistance to shrinkage and distortion and to provide enhanced adhesion for an induction seal closure of the mouth.

Figure 4:
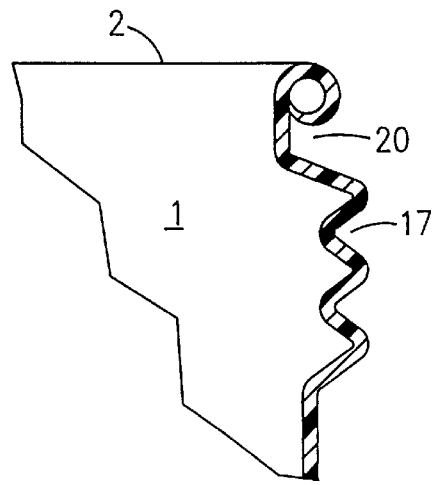
FIG. 4 is a fragmentary sectional view of a wide mouth container which is formed in accordance with the invention, with a curled flange defining the mouth.
Figure 5:
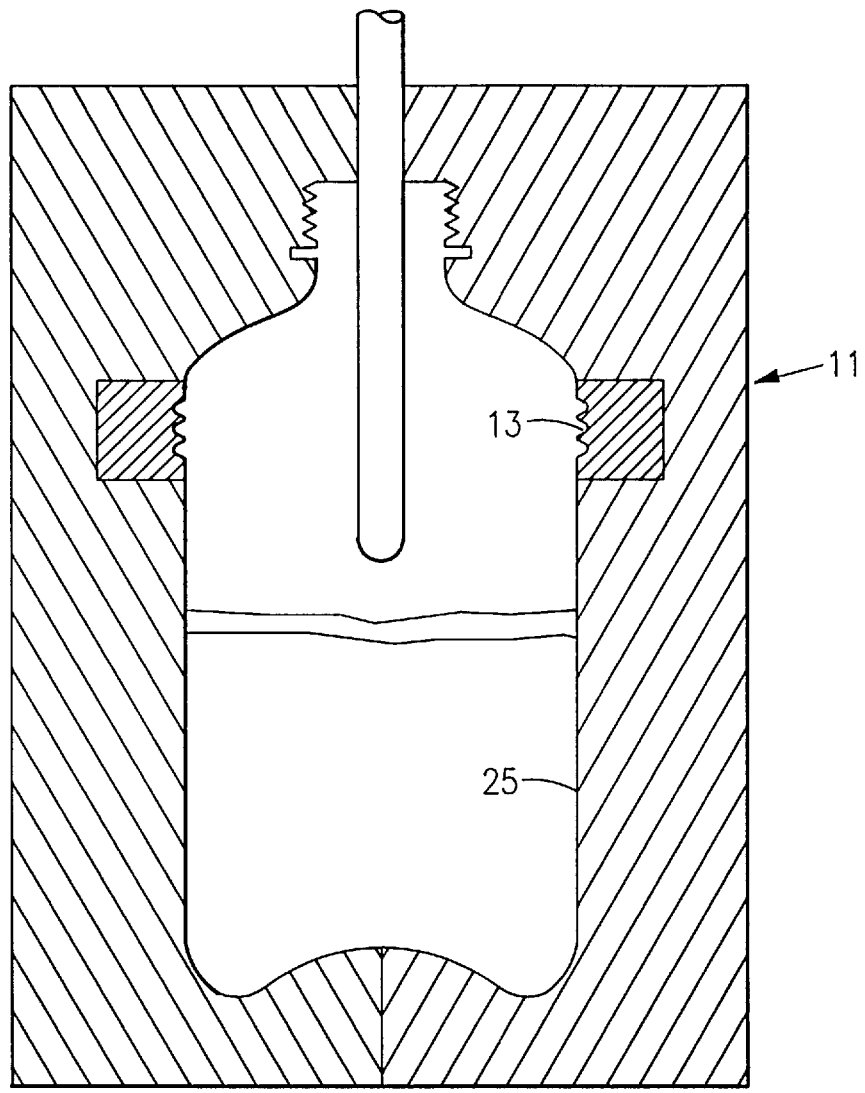
FIG. 5 is a diagrammatic sectional view of the mold used in forming the intermediate article of FIG. 2.

It will be appreciated that a combination of the blown threads of the first embodiment and a flange 22 can be utilized as shown in FIG. 4. In this connection, the flange would normally be rolled outwardly from the axis of the container. The flange could also be inwardly turned in both embodiments described herein.

As seen in FIG. 4, the threaded portion of the container has a thickness of from about 0.015 inches to about 0.060 inches, preferably from about 0.030 inches, the sidewall of the container has a thickness, after transition from the threaded portion, of from about 0.010 inches to about 0.020 inches, preferably about 0.015 inches, and the flange portion, between the threaded portion and the mouth, has a thickness of from about 0.009 inches to about 0.030 inches, preferably about 0.018 inches. These changes in thickness in the container may be achieved by appropriately varying the temperature of portions of the preform in preparation for blow molding.

Figure 8A:
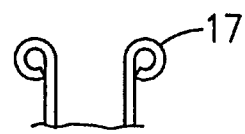
FIGS. 8a, b and c are sectional views of an edge of the container with various finishes.
Figure 9A:
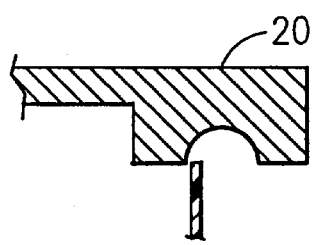
FIGS. 9a, b and c are sectional view of a curling die utilized to finish the edge of the container depicting progressive phases of operation.
Figure 9B:
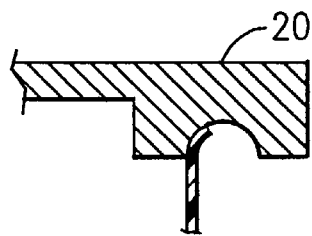
Figure 9C:
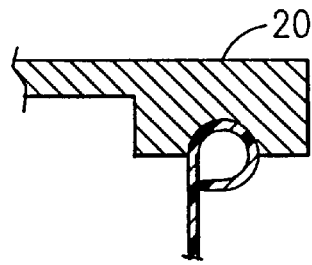

In a preferred embodiment the edge of the mouth 4 is further processed to include curling the edge for increased strength. The edge 16 of the wide mouth container 1 created after the severing of the accommodation portion 10 of the intermediate container 14 can be subjected to further processing. The further processing includes providing a finish on the edge 16 of the wide mouth container 1. As depicted in FIGS. 8a, b and c, the finish could comprise an outward roll 17, an inward roll 18 or a modified flattened roll 19. Production of the curled finish is a function of time, temperature, pressure and tool configuration. This is accomplished once the temperature allows for workability of the edge, by feeding the edge at a predetermined rate into a curling die 20 (FIGS. 9a, b and c) to apply a predetermined pressure so that the flexible edge follows the form of the die and continues to loop around until the desired finish is reached. Various dies can be utilized resulting in numerous finishes.

Although curling of edges is not new in plastic cups, it has not previously been used to curl the edges of biaxially oriented containers or in biaxially oriented heat set containers. Forming the curl advantageously relaxes the material's memory in the area of the curl as a result of the applied heat which anneals the material and tends to render this area amorphous and partly crystallized although not necessarily to the point where the material turns white as a result of the crystallization.

Figure 8B:
Figure 8C:
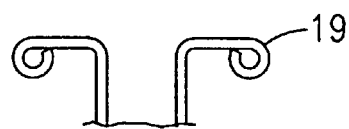

In a preferred construction the container defines a radially inwardly extending curl (see FIG. 8b).

The rolled flange of FIG. 4 may have an outside diameter of about 1.95 inches with the root diameter of the threads being about 2.00 inches.

What is claimed is:

1. A method of forming a wide mouth blow molded biaxially oriented polyethylene terephthalate (PET) container heat set in its entirety to resist shrinkage and distortion at hot fill temperatures greater than 160° F., comprising the steps of i) stretch blow molding a PET preform to form an intermediate article comprising the container, having a base and a cylindrical wall, and an accommodation element, having a neck that supports the preform in a blow mold; ii) heat setting the entire container in the mold by subjecting the entire container in the mold to a temperature of from about 180° F. to about 250° F. for from about 3 seconds to about 4.5 seconds; iii) removing the intermediate article from the mold; iv) severing the container from the accommodation element at a severing location to produce the biaxially oriented PET container heat set in its entirety and having a wide mouth defined by the cylindrical wall; and v) heating the material of the container adjacent the wide mouth until workable and then rolling the material adjacent the wide mouth to form a curled perimeter defining the wide mouth.

2. The method according to claim 1, wherein the step of severing includes removing the container from the accommodation element at a severing location chosen to define the wide mouth as a shape selected from the group consisting of a cylindrical edge, an annular flange extending radially inwardly and an annular flange extending radially outwardly.

3. The method according to claim 1 comprising a step of annealing the material of the curled perimeter after the step of rolling the material.

4. The method according to claim 1 wherein the step of stretch blow molding includes forming container threads during the stretch blow molding of the intermediate article to define in the cylindrical wall of the container adjacent the severing location.

5. The method according to claim 4 comprising a step of selectively heating a thread forming region of a blow mold cavity to a temperature not exceeding about 300° F. and within a range of about 25° F. to about 100° F. above the temperature of the remainder of the blow mold cavity preparatory to blow molding the intermediate article.

6. A wide mouth blow molded container made by the method of claim 1.

7. A method of forming a wide mouth blow molded thermoplastic container having a screw thread formed adjacent the mouth comprising the steps of i) supporting a preform in a blow mold by a preform neck finish, the mold having a cavity defining the outer shape of the container including the thread; ii) without exceeding about 300° F., heating the thread forming portion of the cavity to from about 25° F. to about 100° F. above the temperature of the remainder of the cavity; iii) stretching the preform longitudinally using an extendable stretch rod; iv) blowing the preform to form an intermediate article comprising the container, having blow molded threads connected to the neck finish by an accommodation element; v) heat setting the entire container while in the blow mold at a temperature of from about 180° F. to about 250° F. for a cavity residence time of about 3 seconds to about 4.5 seconds; vi) removing the intermediate article from the mold; vii) severing the container from the accommodation element to form said wide mouth blow molded thermoplastic container having the screw thread formed adjacent the mouth; and viii) finishing an edge of the thermoplastic container that results from the severance of the accommodation element by heating the edge until workable and then rolling the edge into a desired curled shape.

8. The method according to claim 7, wherein the step of finishing further includes rolling the edge to form a curl facing inwardly of the container.

9. The method of claim 8, wherein the step of finishing further includes forming an annular open mouth defining flange which is then rolled to produce the desired shape.

10. The container of claim 9, wherein the threaded portion has a thickness of about 0.030 inches, the sidewall has a thickness of about 0.015 inches and the flange has a thickness of about 0.018 inches.

11. A wide mouth blow molded container made by the method of claim 7.

12. The container according to claim 11, wherein the threaded portion is of a thickness from about 0.015 inches to about 0.060 inches and the thickness of side wall portion of the container is of a thickness of from about 0.010 inches to about 0.020 inches.

13. The container according to claim 12 comprising a curled edge, between the threaded portion and the mouth, having a thickness of from about 0.009 inches to about 0.030 inches.

14. The method of claim 7 further comprising a step of annealing the rolled edge to increase crystallinity of the edge.

* * * * *